Sept. 27, 1949.    G. HAGEN    2,482,907
COUPLING PIN
Filed Sept. 16, 1947

INVENTOR
GLEN HAGEN
BY John W. Michael
ATTORNEY

Patented Sept. 27, 1949

2,482,907

UNITED STATES PATENT OFFICE 2,482,907

COUPLING PIN

Glen Hagen, Clintonville, Wis., assignor to Jack J. Schumacher, Shawano, Wis.

Application September 16, 1947, Serial No. 774,261

2 Claims. (Cl. 280—33.15)

This invention relates to improvements in coupling pins, particularly to coupling pins adapted for connecting trailers and other farm equipment to tractors.

Coupling or king pins of standard design are subjected to intermittent jarring strains while connecting the tractor coupling bar to the trailer tongue or drawbar. Because of this there is a tendency to throw or work such standard pins out of coupling position. Coupling pins provided with locking devices have been designed with the view of eliminating this bad feature. However, the structure of such locking pins is so complex that they are too costly to manufacture in competition with the standard king pins.

It is the object of this invention, therefore, to provide a locking coupling pin of simple construction, which may be inexpensively manufactured and sold in competition with standard coupling pins.

This object is obtained by providing the pin with a light locking frame which is slidably mounted thereon. The locking frame has a pivoted locking arm provided with an opening fittable over the unheaded end of the pin when the locking frame is in extended position relative to the headed end of the pin. A spring reacting between a collar on the pin and the locking frame normally urges the frame into such extended position. Both the frame and collar are readily stamped from sheet steel. The use of a solid headed pin eliminates expensive drilling and machining operations. To hold the collar in place it may have a press fit on the pin or may be welded thereto. To unlock the pin the frame is moved to contracted position relative to the collar, thus freeing the locking arm from the pin end and permitting the locking arm to be swung from alinement with the pin which may then be withdrawn from connecting position in the bars. The collar can be provided with an integral trigger or handle and by manually grasping the frame and the trigger the frame and pin can be readily moved to and held in the contracted position.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
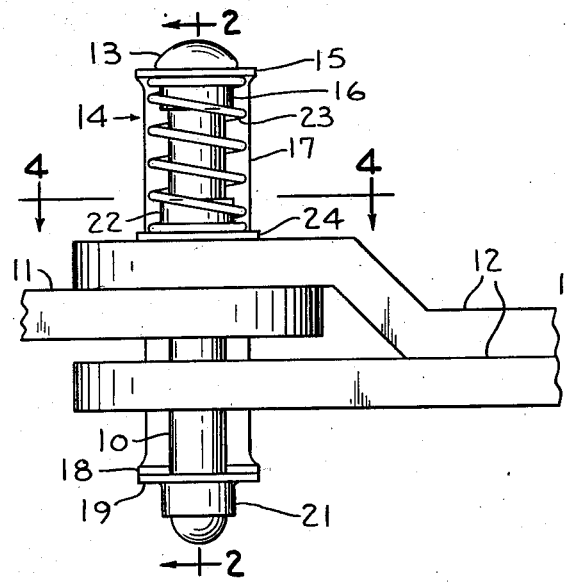
Fig. 1 is a view in side elevation of a commercial form of a coupling pin embodying the present invention.

Referring to the drawing by reference numerals, the pin 10 is shown inserted in the alined openings of a tractor coupling bar 11 and a trailer tongue or drawbar 12. The pin 10 is preferably made of solid steel and has an upset head 13. The pin 10 while of standard diameter is somewhat longer than standard coupling pins. However, there is no drilling or other machining performed on the pin. The unheaded end may be spherically shaped to facilitate entry.

Figure 2:
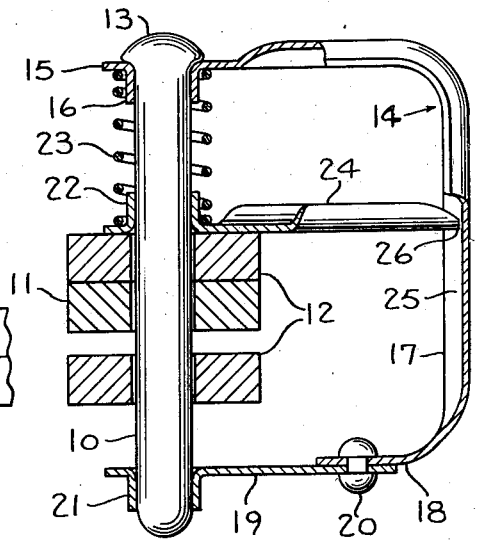
Fig. 2 is a sectional view taken on the line 2—2 of Fig. 1 with parts shown in full for the sake of illustration.

The locking of the pin is accomplished by a locking frame indicated generally at 14 which is slidably mounted on the pin 10 for relative movement longitudinally thereof. The locking frame has an upper arm 15 provided with a swaged out portion 16 containing an opening or bearing which slidably receives the pin 10. The upper arm 15 is connected by a bridge 17, somewhat shorter than the length of the pin 10, to a lower arm 18. A locking arm or plate 19 is loosely swingably mounted by a rivet 20 to the lower arm 18. The locking plate 19 is provided with a swaged out portion 21 containing an opening for receiving the unheaded end of the pin 10. In the extended position, shown in Figs. 1 and 2, the upper arm 15 is in abutment with the head 13 and if the locking arm 19 was then in locking position the unheaded end of the pin 10 would be held in the opening of the swaged out portion 21. The locking frame 14 is normally urged to this extended position by a coiled compression spring 23 acting between the upper arm 15 and a collar 22 fixedly carried on the central portion of the pin 10. The collar 22 may be rigidly secured to the pin 10, after the frame 14 and the spring 23 have been assembled, by providing a press fit therebetween or by welding the collar to the pin.

Figure 3:
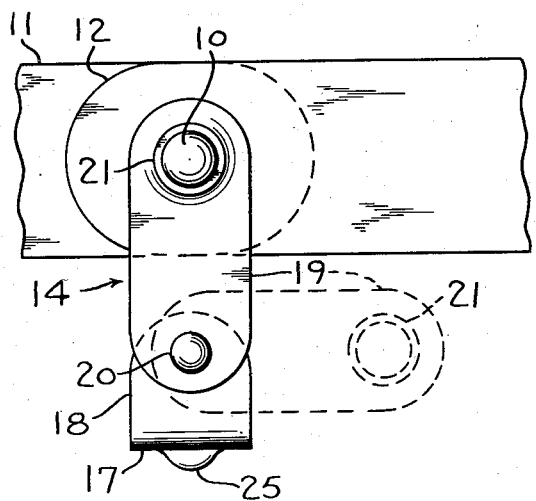
Fig. 3 is a bottom plan view of the coupling pin viewed in Fig. 1 showing in broken line the locking arm swung to unlocked position.
Figure 4:
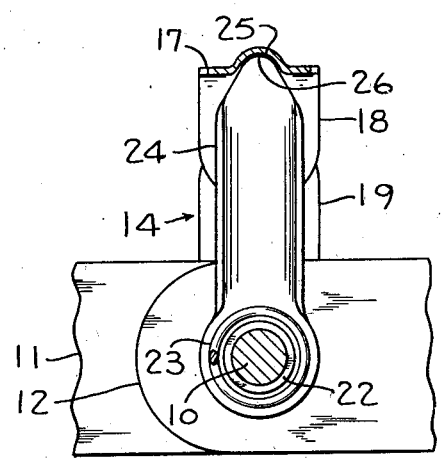
Fig. 4 is a sectional view taken on the line 4—4 of Fig. 1.

To unlock the pin 10 the frame 14 is moved relatively longitudinally toward the collar 22 to contracted position compressing the spring 23. Such movement withdraws the locking arm 19 from engagement with the pin. The locking arm 19, when thus disengaged, may then be swung about the rivet 20 to the position shown in the broken lines of Fig. 3. In such position, the frame and pin may be withdrawn from connecting position in the bars 11 and 12. While the movement of the frame 14 to such contracted position may be accomplished by merely depressing the frame relative to the collar 22, such movement to contracted position cannot be readily accomplished when the pin is not in connecting position, as there is no drawbar 12 against which the collar 22 can bear. It is therefore preferable, although not necessary, to provide the collar 22 with an integrally formed trigger or handle 24. The handle 24 is substantially as long as the upper arm 15 and by manually grasping the handle 24 and the upper arm 15 in the hand, the spring 23 may be compressed and the frame 14 moved to its contracted position. It is desirable to maintain the handle 24 in substantial parallel relation with the upper arm 15. To accomplish this, the connecting bridge 17 is provided with an outwardly formed channel 25 and the end of the handle 24 is provided with a narrowed end 26 projecting into and loosely sliding within the channel 25. It should be noted that the frame 14, locking arm 19, and collar and trigger 22, 24, may all be readily stamped from sheet metal. During such stamping the swaged out portions with their respective pin-receiving openings may be simultaneously formed. Because of this the coupling pin may be manufactured without expensive machining operations and inexpensively assembled. The coupling pin can be held in one hand for inserting or withdrawing it, and it is only necessary to use another hand to swing the locking arm 19 from the locking position shown in full lines of Fig. 3 to the unlocking position shown in broken line of that figure. Because of these features the coupling pin may be sold in competition with the standard king pin which does not have a locking feature.

Although only one embodiment of the invention is shown and described herein, it will be understood that this application is intended to cover such changes or modifications as come within the spirit of the invention or scope of the following claims.

I claim:

1. A lock equipped coupling pin comprising a solid straight-sided pin with a head at one end and an unheaded end, a collar spaced from said head and fixedly secured to said pin, that portion of said pin between said collar and said unheaded end being insertible in the alined openings of bars to be coupled, a locking frame having an upper arm extending laterally of said pin, said arm having a bearing slidably mounted on said pin between said head and said collar, said frame having a bridge extending from said upper arm in substantial axial alinement with said pin, a locking arm pivotally mounted to said bridge to swing in a plane normal to the axis of said pin and having an opening adapted to receive the unheaded end of said pin when swung into axial alinement therewith whereby said portion may be retained in coupling position, and a coil compression spring surrounding said pin and reacting between said collar and said upper arm to resiliently urge said locking frame toward said head to maintain said locking arm opening in engagement with said pin.

2. A lock equipped coupling pin comprising a solid straight-sided pin with a head at one end and an unheaded end, a collar spaced from said head and fixedly secured to said pin, that portion of said pin between said collar and said unheaded end being insertible in the alined openings of bars to be coupled, a locking frame having an upper arm extending laterally of said pin, said arm having a bearing slidably mounted on said pin between said head and said collar, said frame having a bridge extending from said upper arm in substantial axial alinement with said pin, a locking arm pivotally mounted to said bridge to swing in a plane normal to the axis of said pin and having an opening adapted to receive the unheaded end of said pin when swung into axial alinement therewith whereby said portion may be retained in coupling position, and a coil compression spring surrounding said pin and reacting between said collar and said upper arm to resiliently urge said locking frame toward said head to maintain said locking arm opening in engagement with said pin, said collar having an integral laterally extending trigger forming a handle which may be manually grasped in connection with said upper arm to assist in compressing said spring and move said locking frame toward the unheaded end of said pin to disengage said locking arm, said trigger and said bridge being slidably interfitting to maintain said trigger in relative alinement with said upper arm.

GLEN HAGEN.

REFERENCES CITED

The following references are of record in the file of this patent:

UNITED STATES PATENTS

| Number | Name | Date |
| --- | --- | --- |
| 1,974,966 | McClure | Sept. 25, 1934 |
| 2,140,132 | Hollett | Dec. 13, 1938 |
| 2,367,874 | Kelley | Jan. 23, 1945 |
| 2,423,799 | Shelstad | July 8, 1947 |